Aug. 28, 1951 R. C. WEBB 2,565,896
SYNCHRONIZING CIRCUITS
Filed Dec. 31, 1949
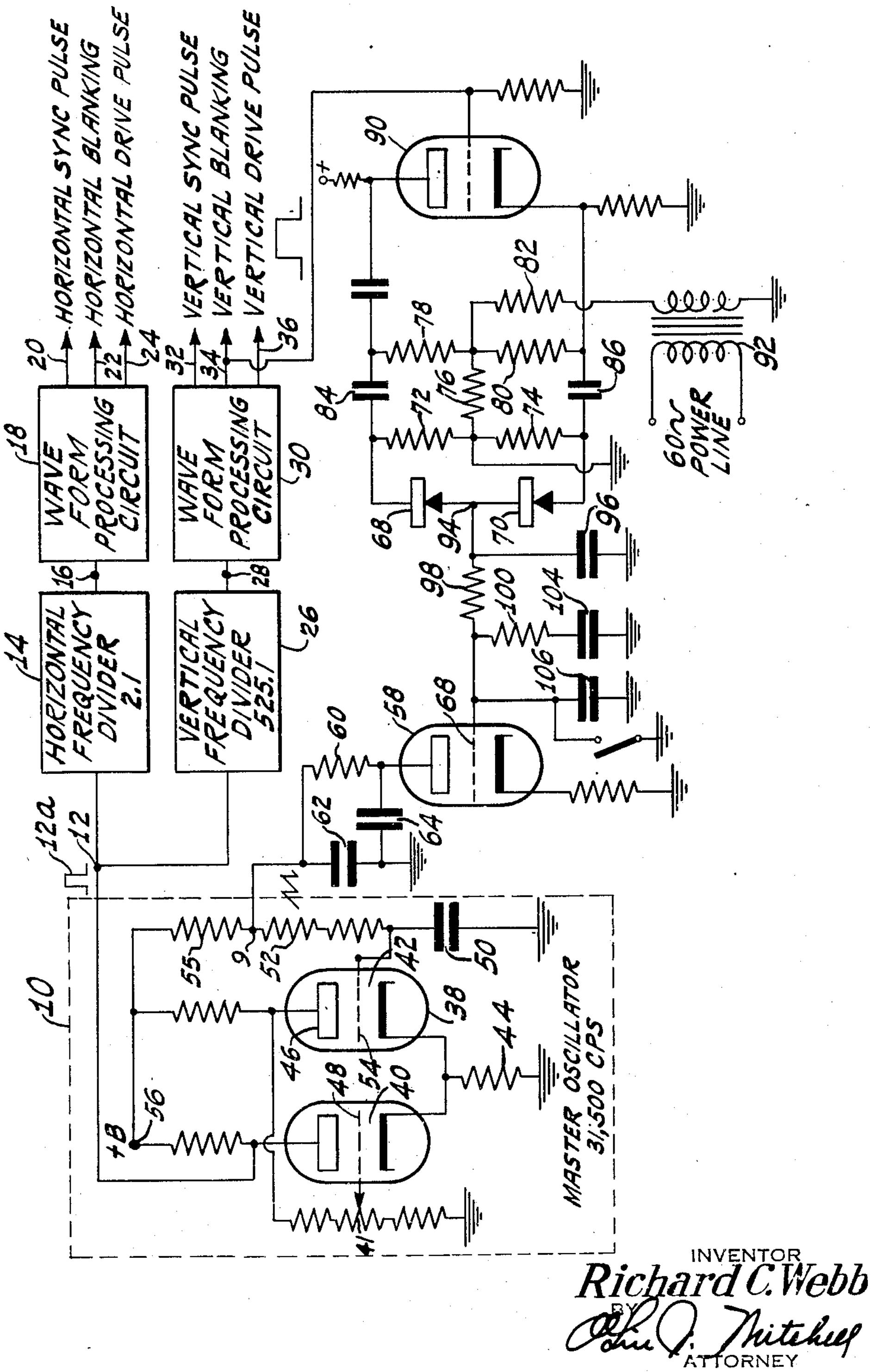
INVENTOR
Richard C. Webb
BY [signature]
ATTORNEY Patented Aug. 28, 1951

2,565,896

UNITED STATES PATENT OFFICE 2,565,896

SYNCHRONIZING CIRCUITS

Richard C. Webb, Princeton, N. J., assignor to Radio Corporation of America, a corporation of Delaware Application December 31, 1949, Serial No. 136,187

2 Claims. (Cl. 250—36)

The present invention relates to electronic synchronizing circuits and in more particularity, although not necessarily exclusively, to synchronizing circuits for time constant type electronic oscillators.

In even still more particularity, the present invention relates to frequency stabilizing circuits for television synchronizing generators in which there is employed a time constant type master oscillator designated for stabilization in accordance with local public utilities 60 cycle power line voltage.

In the electronic art to which the present invention pertains, there commonly arises the need for synchronizing or stabilizing the operating frequency of time constant type oscillators, for example, multivibrator or relaxation type time bases and the like. Perhaps the most common form of such circuit control is found in present-day television receivers in which automatic frequency control of the horizontal deflection circuit is accomplished by frequency comparison between received horizontal sync and the operating frequency of the horizontal deflection circuit multivibrator or relaxation oscillator.

A still further application of automatic frequency control of time constant type oscillators may be found in television synchronizing signal generators wherein it is desirable to lock-in the synchronizing signal generator with the local public utilities power line frequency. In such sync generator control circuits, it has been the practice to compare the frequency of the vertical sync pulse or vertical blanking pulse developed by the sync generator with the 60 cycle sinusoidal voltage of the power line terminals to the sync generator apparatus. The comparison circuit may take a variety of forms but most generally comprises a bridge-rectifier type of comparator circuit well known in the art and described, for example, in the January 1943 issue of The Proceedings of the I. R. E. in an article entitled "Automatic Frequency and Phase Control of Synchronization in Television Receivers" by Wendt and Fredendall. The output voltage of such a bridge-rectifier type comparator circuit is unidirectional in nature and is generally applied to the control electrode of one of the electron discharge tubes of the time constant master oscillator.

Accordingly, automatic frequency control of the operating frequency of time constant type oscillators such as blocking oscillators, multivibrators, etc. by controlling the bias conditions of associated electron discharge tubes in accordance with control voltages developed by frequency comparator circuits is well known. However, depending upon the electrical characteristics of the discharge tubes involved in such time constant oscillator circuits, the degree, stability and linearity of frequency control may be found wanting in many instances. Moreover, it is frequently found that in controlling the frequency of a time constant type oscillator by means of controlling discharge tube bias, undesirable variations in the developed signal amplitude result.

It is therefore a purpose of the present invention to provide an improved type of synchronizing or automatic frequency control circuit for time constant type oscillators.

It is another purpose of the present invention to provide an improved type of automatic frequency control for time constant type oscillators of a type in which it is undesirable to exercise grid bias control of associated discharge tubes.

A still further object of the present invention resides in the provision of an improved frequency control circuit for time constant type oscillators of the multivibrator or relaxation type whereby a more versatile and smoother acting frequency control characteristic is obtained.

Another object of the present invention resides in the provision of an improved form of automatic frequency control for television synchronizing signal generators of the type employing a time constant form of multivibrator.

It is yet another object of the present invention to provide a frequency control time constant multivibrator circuit in which the amplitude of developed signal is rendered substantially independent of the influence of frequency control action.

In the application of the present frequency control system to time constant type oscillators the present invention contemplates the use of an electron discharge tube whose anode-cathode path is directly associated with one or more of the time constant circuits upon which the oscillator depends for frequency definition. The electron discharge tube is connected such that as the resistance of its anode-cathode path is varied in accordance with voltage variations applied to its associated control electrode, the RC value of the time constant circuit with which it is connected is altered so as to effect a change in the operating frequency of the time constant oscillator.

For automatic frequency control of such time constant oscillators embodying the present invention, the voltage applied to the control electrode of the variable resistance discharge tube may be derived from a frequency comparator circuit which compares the signal frequency of the time constant oscillator with some standard frequency source.

A more complete understanding of the character and operational mode of the present invention, as well as many other of its objects and features of advantage in addition to those set forth hereinabove may be obtained through the reading of the following description, especially when taken in connection with the accompanying drawing which schematically and by block representation shows an embodiment of the present invention as applied to master oscillator control of a television synchronizing signal generator.

Referring now to the drawing, there is illustrated in the dotted line area 10 a typical form of time constant type oscillator which is shown herein, by way of example, to act as the master oscillator for a conventional synchronizing signal generator. Further, by way of example, the master oscillator has been assigned a nominal frequency of 31,500 cycles per second in order to form the basis of standard television synchronizing signal formation. In accordance with conventional practice, the pulse output appearing at terminal 12 of the master oscillator, is applied to a horizontal frequency divider 14 which halves the master oscillator frequency to provide at its output terminal 16 an appropriate 15,750 C. P. S. control signal for control of the horizontal waveform processing circuits 18. At the output channels 20, 22 and 24 of the waveform processing circuits there are, respectively, indicated horizontal sync pulse information, horizontal blanking information and horizontal drive pulse information.

The 31,500 C. P. S. output of the master oscillator 10 is, in further accord with conventional synchronizing signal generator practice, applied to the input of a vertical frequency divider 26 which establishes a 525:1 division of the master oscillator frequency. This division of the frequency divider 26 need not necessarily be accomplished by a single count-down or frequency divider stage but may comprise a plurality of individual frequency divider stages in cascade, the product of all of the individual divisions being equal to the required 525. Thus, the output of the frequency divider 26 will comprise control signals having a repetition rate of 60 C. P. S. which will appear at the output terminal 28. Accordingly, these control signals are applied to the waveform processing circuits 30 at whose outputs 32, 34 and 36 are respectively found vertical sync pulse information, vertical blanking information and vertical drive information.

Inasmuch as the actual forms of modern day synchronizing signal generators are well known to those skilled in the art to which the present invention pertains, a detailed discussion of the horizontal and vertical frequency divider circuits 14 and 26 as well as the waveform processing circuits 18 and 30 is thought, for present purposes, to be superfluous. If, however, further information as to the circuit configuration suitable for application in these block representations is desired, reference may be made to an article entitled "A Precision Television Synchronizing Signal Generator" by J. P. Smith and Alda V. Bedford appearing in the July 1940 issue of the RCA Review as well as in a U. S. Patent No. 2,132,655 to J. P. Smith entitled "System for Producing Electrical Impulses" issued October 11, 1948.

The particular form of master oscillators shown in the dotted line area 10 is further well known in the art and is described in U. S. Patent No. 2,383,822 entitled "Oscillation Generator" by Kurt Schlesinger, issued August 28, 1945. As indicated, the envelope 38 comprises two discharge tube sections 40 and 42, the input and output circuits of the two tubes being respectively coupled by means of the common cathode resistors 44. The anode 46 of the discharge tube 42 is directly coupled to the control electrode 48 of the discharge section 40 so that upon linear charging of the capacitor 50 to a predetermined level, the anode current in the section 42 causes the grid 48 in tube section 40 to swing negatively, thereby causing the cathodes of both discharge tubes to swing negatively. As they swing negatively, the control electrode 54 of discharge tube 42 begins to conduct and acts to discharge the capacitor 50 in typical sawtooth fashion. After capacitor 50 has discharged sufficiently, conduction of the control electrode 54 is normally established so that the anode current in the tube section 42 decreases. The resulting increased conduction of tube section 40 causes the common cathodes to become more positive and re-establish conditions for the uninhibited linear charge of the capacitor 50. It is therefore seen that the frequency of the master oscillator 10 can be effectively controlled by varying the time constant of the capacitor 50 taken in combination with the resistors 52 and 55, through which it charges from the source of B power supply potential 56.

According to the present invention, the value of the time constant circuit including capacitor 50 is controlled by means of a discharge tube 58 whose anode-cathode circuit is, via resistance 60, connected in shunt with the capacitor 50 through a portion of the charging resistance 52. Additional capacitors 62 and 64 are connected on either side of the series resistance 60 to ground for filtering purposes. Thus, if the discharge tube 58 is made more conductive, it is apparent that the time constant of the circuit embracing storage capacitor 50 will be reduced and, therefore, increase the operating frequency of the master oscillator 10. On the other hand, if the discharge tube 58 is made less conductive, the time constant of the master oscillator 10 will decrease and its operating frequency increase. Since the charging potential available at terminal 56 for the storage capacitor 50 remains constant and the bias applied to the control electrode 48 of tube section 40 remains constant, it is evident that the amplitude of the sawtooth developed across the capacitor 50 will remain substantially constant regardless of the time constant value. This, of course, means that the control pulse 12a developed at the anode of tube section 40 will also remain of constant amplitude and thereby tend to stabilize the operation of the horizontal and vertical frequency dividers 14 and 26.

Another way of viewing the novel action of the present invention is to consider the discharge tube 58 not only as a device for controlling the composite time constant of the circuit associated with capacitor 50 but, also as a means for varying the charging potential available to the time constant circuit comprising capacitor 50 and resistor 52. By way of example, the terminal 9, defining the junction between resistors 52 and 55, may be considered as the supply point of charging potential for the capacitor 50 so that as the conductance of the discharge tube 58 increases, the potential available for the charging of capacitor 50 will be reduced and the frequency of oscillation will decrease. On the other hand, should the conductance of the discharge tube 58 decrease, the IR drop through resistance 54 will decrease and the potential at terminal 9 will increase. This, in turn, allows capacitor 50 to more quickly charge up, through resistance 52, to a predetermined recycling level and thereby increase the oscillator frequency. It is noted that the potentiometer 41 may be used to adjust the nominal operating frequency of the master oscillator operation since it, in effect, determines the amplitude to which the capacitor 50 must charge in order to initiate recycling of the multivibrator circuit.

Any means may be used to vary the conductance of the discharge path 58. In the example shown the control electrode 66 of the discharge tube 58 is adapted for control from the output of a bridge-rectifier type of frequency comparator circuit comprising diodes 68 and 70, as well as resistance elements 72, 74, 76, 78, 80 and 82, all taken in connection with capacitive elements 84 and 86. This form of frequency comparator circuit is well known in the art and its general operating mode is fully described in the above-referenced article by Wendt and Fredendall appearing in the January, 1943 issue of The Proceedings of the I. R. E. As indicated, push-pull vertical blanking signals are applied across one arm of the bridge by means of the discharge tube 90, the signals at its anode and cathode, in the connection shown, being 180 degrees out of phase with one another. Local 60 cycle power line frequency is then applied through resistance 82 to the center of the bridge circuit by means of the transformer 92. Thus, the unilateral potential appearing at the junction 94 of the diodes 68 and 70 will vary in accordance with the frequency and phase difference between the 60 cycle power line and the vertical blanking signal developed by the synchronizing generator. Accordingly, with the electrical sense of the developed signal being established as shown in the drawing, this unilateral control potential developed at the output terminal 94 of the bridge comparator circuit may be filtered by means of the elements 96, 98, 100, 104 and 106 for stabilizing control of the master oscillator frequency via the above-described discharge tube 58. Thus, the master oscillator frequency will be automatically adjusted by means of the discharge tube 58 so that isochronism may be obtained between the 60 cycle power line and the vertical blanking pulse.

It is evident that although the present invention has been shown in connection with a time constant oscillator used as a master oscillator for a television synchronizing signal generator that its utility is in no way limited thereto. For example, the novel control system of the present invention may be well applied to other forms of time constant oscillators such as the conventional blocking oscillator found in the horizontal deflection circuits of present-day television receivers. In such latter use, if automatic frequency control were desired, the frequency comparator circuit would be adapted to compare incoming horizontal sync as received by the receiver, with the signal frequency developed by the blocking oscillator.

From the foregoing, it may be seen that the present invention provides a substantial improvement in time constant type oscillator frequency control, and it is eminently adapted for automatic frequency control applications in which the time constant oscillator with which it is associated is to be frequency stabilized from a standardizing frequency source.

Having thus described my invention, what I claim is:

1. In a frequency stabilized sawtooth generating system including a source of standardizing frequency, the combination of, an electron discharge device including a cathode, an anode and a control electrode, an electrical storage element connected between the control electrode and a predetermined point of fixed potential, means for supplying charging energy at a substantially uniform rate in a positive direction to the storage element, means to bias the cathode of the discharge device relative to the point of fixed potential to a predetermined amount, a second electron discharge device also including a cathode, a control electrode and an anode, an impedance element connected between the anode of the first electron discharge device and said point of fixed potential, a connection between the second named control electrode and an intermediate point of said impedance element, a connection between the cathode of the second discharge device and the cathode of the first discharge device, so that at a time period when the charge acquired by the storage element is equal to the cathode bias, a discharge of the storage element is initiated and the cathode approaches at the potential of the fixed point so as to accelerate the discharge rate of the storage element, a third electron discharge tube having an anode-cathode path and a control electrode, connections placing the anode-cathode path of said third discharge tube in shunt with said storage element, a frequency comparator circuit connected to receive and compare both said standardizing frequency and signals derived from the output of said sawtooth generating system to develop a control potential representative of frequency differences between the compared signals, and connections applying said control potential to said third electron discharge tube control electrode.

2. Apparatus according to claim 1 wherein there is additionally provided a low pass filter circuit connected in series with the connection of said third discharge tube anode and said first discharge tube control electrode.

RICHARD C. WEBB.

REFERENCES CITED

The following references are of record in the file of this patent:

UNITED STATES PATENTS

| Number | Name | Date |
|---|---|---|
| 2,201,978 | Bedford | May 28, 1940 |
| 2,383,822 | Schlesinger | Aug. 26, 1945 |
| 2,389,025 | Campbell | Nov. 13, 1945 |
| 2,477,076 | Miller | July 26, 1949 |
| 2,492,018 | Sunstein | Dec. 20, 1949 |
| 2,521,058 | Goldberg | Sept. 5, 1950 |